United States Patent [19]

Sakotani et al.

[11] 4,277,346
[45] Jul. 7, 1981

[54] TREATING AGENTS FOR WASTE WATER CONTAINING DYES AND/OR OTHER ORGANIC SUBSTANCES, A PROCESS FOR TREATING SAID WASTE WATER BY USING THE SAME

[75] Inventors: Akio Sakotani; Tohru Gomi, both of Shizuoka, Japan

[73] Assignee: Heitaro Katsukawa, Tokyo, Japan

[21] Appl. No.: 52,642

[22] Filed: Jun. 27, 1979

[30] Foreign Application Priority Data

Jun. 27, 1978 [JP] Japan .................................. 53/77045
Mar. 3, 1979 [JP] Japan ............................ 54/26349[U]

[51] Int. Cl.³ ................................................ C02F 1/28
[52] U.S. Cl. .................................... 210/691; 210/716; 210/502; 252/463
[58] Field of Search .................. 210/40, 47, 691, 716, 210/721, 502; 252/463, 475; 423/119

[56] References Cited

U.S. PATENT DOCUMENTS

| | | | |
|---|---|---|---|
| 3,909,406 | 9/1975 | Lang | 210/47 |
| 4,019,982 | 4/1977 | Ikari et al. | 210/47 X |
| 4,216,084 | 8/1980 | Ikari et al. | 210/691 X |
| 4,216,086 | 8/1980 | Lang | 210/716 X |

*Primary Examiner*—Thomas G. Wyse
*Attorney, Agent, or Firm*—Sughrue, Rothwell, Mion, Zinn and Macpeak

[57] ABSTRACT

The present invention relates to novel treating agents for treating waste water containing dyes and/or other organic substances, a process for treating said waste water by using said treating agent, and an equipment for the same.

The treating agent is prepared by mixing component A comprising a water-insoluble calcium salts and component B consisting mainly of aluminum hydroxide, aluminum oxide or a mixture thereof at a molar ratio of 3:1 to 1:3 and heating said mixture of components A and B as such or after granulation at a temperature between 100° C. and 450° C.

The treating agent thus obtained has excellent adsorption and oxidative ability and is capable of easily clarifying waste water discharged from fiber processing plants that contains a variety of dyes and other organic substances, for example, sizing agents such as starch, polyvinyl alcohol and C.M.C., and surfactants, alone or in combination through one contact step, as opposed to conventional processes which require a number of steps using many kinds of treating agents. The present invention also involves a process and equipment for treating said waste water, in which said waste water is brought into contact with said treating agent packed in a column while introducing an inactive gas, such as air through the bottom of the column, wherein the gas inlet holes and liquid outlet holes are disposed in the funnel-shaped lower section of the column at an angle of 50 degrees or less, preferably 20 to 30 degrees, with respect to the wall of said funnel-shaped section, thereby allowing continuous operation over a prolonged period without any clogging inside the column.

8 Claims, 3 Drawing Figures

TREATING AGENTS FOR WASTE WATER CONTAINING DYES AND/OR OTHER ORGANIC SUBSTANCES, A PROCESS FOR TREATING SAID WASTE WATER BY USING THE SAME

BACKGROUND OF THE INVENTION

1. Field of Invention

The present invention relates to treating agents for clarifying waste water containing dyes, other organic substances or a mixture thereof, processes for clarifying said waste water by using the same, and equipment for the same. More specifically, the present invention relates to treating agents for clarifying colored, scouring or dyeing waste water with high C.O.D. values discharged from textile mills by one step through adsorption and oxidative; processes for clarifying said waste water by useing the same; and equipment for the same.

2. Description of the Prior Art

Among the processes for treating scouring and dyeing waste water discharged from textile finishing mills, the most commonly used are the activated sludge process, the coagulation process and the active carbon adsorption process.

In most cases, the waste water discharged from textile finishing mills contains, other than dyes, organic substances such as sizing agents, e.g. starch, polyvinyl alcohol and C.M.C., and surfactants. In addition, dyes contained in this type of waste water are very diverse; for example, direct dyes, acid dyes, basic dyes, disperse dyes and sufur dyes. As the result, the waste water from textile finishing mills is quite diverse in property, such as C.O.D., S.S., color and foaming characteristics.

The problems involved in the activated sludge process are the large installation space required and the difficulty in operation control; the process is greatly influenced by the temperature of waste water to be treated and requires strict control of water temperature, and extreme care must be taken concerning proper air supply and other controls, which makes it difficult to be managed by unskilled operators. Furthermore, surfactants and dyes cannot be completely removed by this process.

The coagulation process also requires a large installation space for the settling tank, such as thickener. Another problem is that most surfactants and some dyes cannot be removed by coagulants.

The principal disadvantage of the active carbon adsorption process is that some dyes and organic substances cannot be adsorbed by active carbon.

As apparent from the above, it is impossible in conventional processes to successfully treat scouring and dyeing waste water containing a variety of dyes and other organic substances by one process; hence it is common practice at present to treat such kinds of waste water by combination of two or more types of processes. Even with such combination methods, complete removal of impurities contained is difficult.

Typical flow sheets of conventional processes are shown in FIGS. 1 and 2, wherein numeral 1 is the scouring and dyeing waste water to be treated, numeral 2 is pH adjustment, numeral 3 is the coagulation tank, numeral 4 is the coagulating agent, such as aluminum sulfate, numeral 5 is the settling tank, numeral 6 is the activated sludge processing tank, numeral 7 is the final settling tank, and numeral 8 is the active carbon adsorption column.

In FIG. 1, dyes are removed in coagulation tank 3, and other organic substances are treated in the activated sludge processing tank 6. Similar steps are followed also in FIG. 2, in which, however, dyes and other organic substances of extremely low concentration not removed through steps up to the final settling tank are processed in the succeeding steps.

As may be seen from these figures, the processes hitherto employed require large equipment to be installed in vast area and are very difficult to control. In addition, they suffer from poor efficiency in operation, taking about 520 minutes for the process in FIG. 1, and about 550 minutes for the process in FIG. 2, for the waste water to pass through the whole system.

Processes using waste aluminum sludge which consists mainly of aluminum oxide have been recently proposed. One example relates to a process in which waste aluminum sludge and an acidic solution are admixed to the waste water to be treated, sodium hydroxide is added to this mixture to cause coagulation, and the agglomerates thus obtained are heated at 400° to 500° C. (Japanese Patent Application No. 45454, 1976, Laid Open). Another example deals with a process using waste aluminum sludge heat-treated at 70° to 1200° C. (Japanese Patent Application No. 123487, 1974, Laid Open).

The former example uses the waste aluminum sludge as a coagulating agent and the latter utilizes it as an adsorbent. Hence, they are not free from the disadvantages that large equipment and large installation space are required and that other types of processes must be used in combination.

SUMMARY OF THE INVENTION

The present invention was accomplished in order to overcome these difficulties involved in conventional processes.

The primary object of the present invention is to offer a treating agent capable of removing dyes and/or other organic substances contained in waste water at the same time through adsorption and oxidative.

The second object of the present invention is to offer a process by which various kinds of dyes and surfactants contained in waste water can be removed at the same time by one step.

The third object of the present invention is to offer a process as described above which allows continuous operation for a long period without clogging in the treating agent packed in the column.

The fourth object of the present invention is to offer an equipment suitable for putting the process as described above into practice.

BRIEF DESCRIPTION OF THE DRAWINGS

FIGS. 1 and 2 show typical flow sheets of conventional processes for treating dyeing and scouring waste water discharged from textile finishing mills, while

DESCRIPTION OF THE INVENTION

Figure 1:
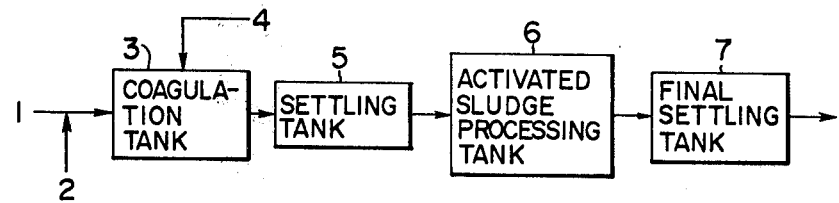
Figure 2:
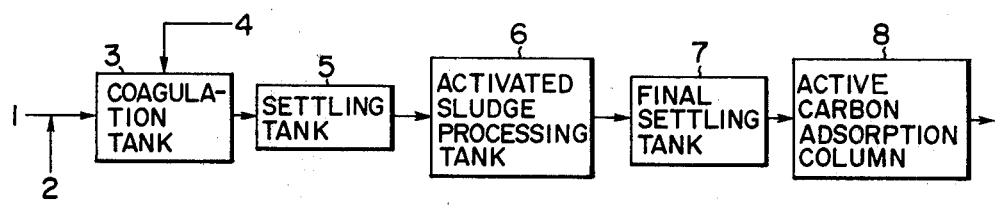

The inventors of the present invention formerly found that gases and heavy metals can be readily adsorbed by a product obtained by heat-treating a mixture of a water insoluble calcium salt with a substance consisting mainly of aluminum hydroxide, aluminum oxide or a mixture thereof at a selected ratio. Further studies have led us to the findings that a product which is obtained by mixing component A comprising a water insoluble calcium salts and component B consisting mainly of aluminum hydroxide, aluminum oxide or a mixture thereof at a molar ratio of 3:1 to 1:3 and heating said mixture at temperatures between 100° to 450° C. exhibits excellent oxidative adsorption ability and that, upon contact with this product, any kinds of dyes and other organic substance contained in waste water can be completely removed at the same time through adsorption and oxidative. The present invention has been accomplished based on these findings.

As component A of the treating agent in the present invention, may be used aluminum hydroxide, aluminum oxide or any substances consisting mainly of the same, for example, the aluminum sludge discharged from the aluminum anodizing process. As examples of water insoluble calcium salts, there may be mentioned, among others, calcium sulfate, calcium carbonate, calcium oxalate, calcium phosphate and calcium fluoride. These are used alone or in combination, or those substances containing these calcium compounds as the main component, such as the calcium sulfate containing other impurities derived from the lime process for exhaust gas desulfurization, may also be used.

The molar ratio of component A to component B must be within the range of from 3:1 and 1:3, preferably 1:1. If this ratio exceeds 3, the oxidative adsorption ability of the product will decrease; if the ratio is less than $\frac{1}{3}$, the mechanical strength of the product will decrease. A binder, such as a phenol resin, may also be incorporated in the mixture to facilitate its granulation.

The mixture of components A and B is then heated at temperatures between 100° and 450° C.

If the heat treatment temperature is out of this region, the oxidative adsorption ability and mechanical strength of the product will both be decreased. It is preferable to mold this mixture into small spherical granules about 3 to 6 mm in diameter.

According to the process of the present invention, the treating agent thus obtained is packed in a column, through which waste water containing dyes and/or other organic substances is allowed to flow. Through this simple operation, the dyes and other organic substances contained can be removed by one step. Waste water containing dyes or other organic substances alone, such as domestic waste water, can of course be processed successfully in the similar way.

More efficient removal of dyes and/or other organic substances is achieved when waste water containing the same is allowed to flow down through a column packed with said granulated treating agent while blowing an inactive gas (e.g. air) through the bottom of the column to fluidize the treating agent. The way in which waste water is brought into contact with the treating agent is not confined to those mentioned above, but any practicable methods may be applied. For example, the treating agent, granulated or powdered, may be added to waste water containing dyes and/or other organic substances at a concentration of 5 ppm or more, agitated for several seconds or longer, and settled.

The reason why the treating agent of the present invention exhibits excellent ability not found in conventional ones is not clear at present. However, it may be assumed that this is ascribable to the fact that this treating agent has oxidative effects as well as adsorption ability, as opposed to conventional agents which exhibit adsorption ability only.

Figure 3:
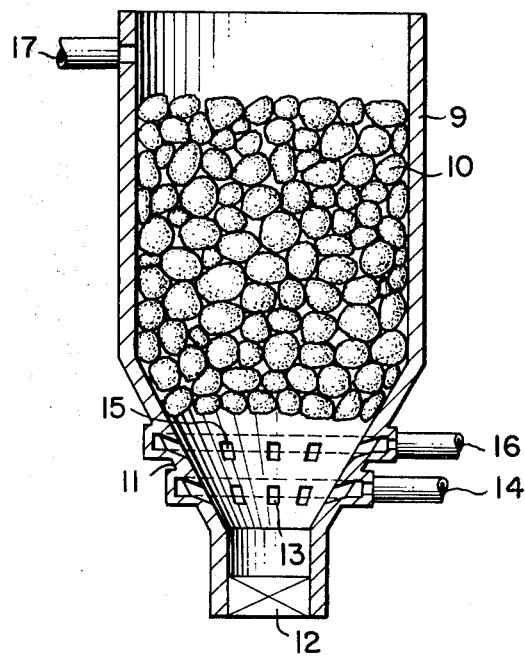
FIG. 3 illustrates the sectional side view of an embodiment of the equipment for practicing the process of the present invention.

An embodiment of the processes of the present invention is shown in FIG. 3, in which numeral 9 is the column, numeral 10 is the packings (the treating agent of the present invention), numeral 11 is the funnel-shaped wall in the lower portion of the column, numeral 12 is the valve for taking out the packings, numeral 13 is the nozzles for introducing an inactive gas (e.g. air), numeral 14 is the supply pipe for the inactive gas, numeral 15 is the holes for feeding or withdrawing the liquid, and numerals 16 and 17 are liquid supply or take-out pipes. Holes 13, 16 and 17 have an inner diameter smaller than the size of the packings and are disposed downwardly and inwardly of column 9 at an inclination of 50 degrees or less, preferably 30 to 20 degrees, with respect to the wall of the funnel-shaped section of the column. If the inclination angle exceeds 50 degrees, clogging tends to occur inside the column; if the inclination angle is less than 20 degrees, their installation in the wall will be difficult.

Operation of the process of the present invention is described below taking the down-flow mode as the example.

The waste water to be treated (hereinafter referred to simply as "the treating liquid") is fed through the top of column 9. While descending through the gaps between packings 10, the impurities contained in the liquid are adsorbed by the treating agent. The treating liquid thus purified flows down and reaches liquid outlet holes 15, where the flow is inverted and the liquid moves upward along the outlet holes. Because of this reversal in flow direction, suspended solids which may otherwise cause clogging will continue to move downward along the funnel-shaped wall. As the result, few suspended solids flow into the outlet holes, allowing continuous operation for a long period without clogging. Since liquid outlet holes 15 are disposed at an inclination, their sizes will be smaller when viewed from the column top (for example, they will be oval for round tubes). This also help retard the suspended solids from entering the outlet holes, minimizing clogging. The same is true with inactive gas inlet holes which are also disposed downwardly and inwardly of the column at an inclination. When the operation is stopped, the suspended solids remaining in the column will move downward, causing no clogging of the liquid and inactive gas outlet holes.

During the course of operation described above, an inactive gas supplied from supply pipe 14 is introduced into the column through gas inlet holes 13. Blowing of the inactive gas may be continuous or intermittent, but continuous introduction will be preferable to provide an even flow of the treating liquid at all times over the entire cross section of the column, thus ensuring uniform processing throughout the whole operation period. The treating liquid runs slower near the wall than around the center of the column because of increased friction. However, the same is true with the flow of gas moving in the reverse direction for the same reason. This results in the more uniform flow rate of the descending liquid across the cross section of the column. Another advantage of continuous introduction of the inactive gas is that the space packing rate of the treating agent inside the column can be increased up to 40 to 45%. Furthermore, the inactive gas introduced helps remove the solid particles clogging the particles of treating agent and ensures uniform performance of the treating agent throughout the column by slowly displacing it up and down.

Next, the operation in the up-flow mode will be described. The treating liquid, supplied from liquid supply pipe 8 mounted below column 1, is introduced into the column through liquid inlet holes 15 and is allowed to move upward through the gaps between the treating agent particles by the liquid supply pressure. At the same time, the inactive gas is introduced from gas supply pipe 6 into the column through gas inlet holes 5. The inactive gas moves upward while blowing up the solid substances clogging the gaps between the particles of the treating agent, thus ensuring continuous operation for a long period. When the operation is stopped, the suspended solids tend to move downward but they will not enter and clog the liquid and gas inlet holes because they are disposed downwardly at an inclination.

In the up-flow mode of operation, the treating liquid and the inactive gas flow in the same direction. Unlike the conventional forced flowing processes, however, the contact time of the treating agent with the treating liquid is little affected, because of the use of an inactive gas and the upward direction of flow. Experiments showed satisfactory results when the gas hold-up rate is kept 10 to 15% for a column with a space packing rate of about 30%.

In both the down-flow and up-flow operations, the treating agent inside the column can be easily replaced by the operation of shutter valve 4.

The figure shows an example in which inactive gas inlet holes 13 are built below liquid inlet or outlet holes 15. However, the levels at which these two kinds of holes are built may be reversed or the same. Or, double tubes serving the purposes for both gas an liquid delivery may also be used. These holes may be drilled in the wall of the funnel-shaped section of the column or may be formed by insertion of pipes through the wall.

As inactive gases to be used in the present invention, any gas that will not damage the treating agent in the column and will not react with the treating liquid may be employed. Usually, air is used advantageously.

The present invention will become more apparent from the examples described below.

EXAMPLE 1

A pasty mixture of aluminum hydroxide and calcium sulfate at a molar ratio of 1:1 is mixed with 3 weight % of a phenol resin. This mixture is shaped into spherical granules of 5 mm in diameter and heated at 200° C. for five hours.

Four hundred grams of the granules thus obtained are packed in an adsorption column 4 cm in inside diameter and 1 m in height to a packing height of 38 cm. Into this column, the waste water of the following composition discharged from a textile printing mill was continuously flown upward through the bottom at a rate of 480 cc per hour. The residence time was 20 minutes. The treated liquid was analyzed at an interval of two hours and the results averaged. The properties of the waste water before and after processing are tabulated in Table 1.

TABLE 1

|  | Before processing | After processing |
|---|---|---|
| C.O.D. | 780 ppm | 32 ppm |
| pH | 7.0 | 7.4 |
| Dye concentration | 48 ppm | ≈ 0 |
| Foaming | Considerable foaming | Little foaming |

TABLE 1-continued

|  | Before processing | After processing |
|---|---|---|
| Note 1. | The figures for the treated liquid are the averages in 40 hour operation. | |
| Note 2. | Dyes, sizes and surfactants contained are as follows: | |
| Dyes (Acid dyes) | BLACK BGL (Nippon Kayaku) IRGALAN BLACK BGL (Ciba-Geigy) SKY BLUE FSE (Mitsuitoatsu) KAYANOL BLUE SR (Nippon Kagaku) | |
| Sizing agents | Pine Gum (Komatsu Shoten) (Main component: C.M.C. and Na alginate) ACJ 200P (Kyoto Seiko) (Main component: Processed starch and Guar gum) | |
| Surfactant | Laundry soap (Daiichi Kogyo Seiyaku) | |

As apparent from the table, all of the dyes, sizes and surfactants have been removed and the processed water meets the water quality standard.

EXAMPLE 2

Using the same treating agent and the same adsorption column as in Example 1, aqueous solutions containing various types of dyes at a concentration of about 50 ppm were treated in the similar way. The properties of the treated solutions are listed in Table 2.

TABLE 2

| Type | Name | Before processing, ppm | After processing, ppm |
|---|---|---|---|
| Acid dye | Sky Blue FSE | 49.5 | ≈ 0 |
| Sulfur dye | Sulphor Black FBB | 50.0 | ≈ 0 |
| Disperse dye | Kayalon Fast Orange GR | 49.2 | <0.8 |
| Reactive dye | Mikaclon Brilliant Red B | 48.8 | ≈ 0 |

As apparent from the above, all the dyes can be adsorbed regardless of their types.

EXAMPLE 3

Using the same treating agent and the same adsorption column as Example 1, waste water of the following composition discharged from a textile printing mill was processed in the down-flow mode at a flow rate of about 80 cc per hour. The residence time was 120 minutes. The results are shown in Table 3.

TABLE 3

|  | Before processing | After processing |
|---|---|---|
| C.O.D. | 700 ppm | 41 ppm |
| pH | 7.0 | 7.3 |
| Dye concentration | Taken as 1 | 1/50 |
| Foaming | Considerable foaming | Little foaming |
| Note 1. | The figures for the treated solution are the averages in 40 hour operation. | |
| Note 2. | The components of the treating solution are as follows: | |
| Disperse dye | Diamix Gray R-SE (Mitsubishi Kasei) | |
| Reactive dye | Procion Brilliant Red (I.C.I.) | |
| Sizing agent | Starch and Na alginate | |
| Surfactant | Laundry soap (Daiichi Kogyo Seiyaku) | |

As can be seen from the table, all of the dyes, sizing agents and surfactants have been removed almost completely and the processed water meets the water quality standard.

EXAMPLE 4

Using the same treating agent and the same adsorption column as in Example 1, air is introduced through the bottom of the column to form a fluidized bed. To this fluidized bed of the treating agent, was introduced continuously the same waste water as used in Example 3 downward at a flow rate of 80 cc per hour.

The processed water was analyzed at an interval of two hours. The results are listed in Table 4.

TABLE 4

|  | Before processing | After processing |
|---|---|---|
| C.O.D. | 700 ppm | 13 ppm |
| pH | 7.0 | 7.3 |
| Dye concentration | Taken as 1 | 1/130 |
| Foaming | Considerable foaming | Little foaming |

Note 1. The figures for the processed water are averages for 40-hour operation.

As may be seen from the table, all of the dyes, sizing agents and surfactants have been removed almost completely, and the processed water meets the water quality standard.

EXAMPLE 5

Continuous operations according to the process of the present invention and using the equipment offered by the present invention showed the following results.
(A) Treating agent: Spherical adsorption packings of 3 to 5 mm φ (the agent used in Example 1)
Column diameter: 40 mm φ
Packing height: 760 mm
Liquid flow rate: 1.6 l/hr, down flow
Suspended solid (SS) in the treating liquid: 750 to 1000 ppm
Air blowing: Gas hold-up rate, 10 to 15%

Under conditions described above, fully continuous operation was conducted without any troubles over a period of two months. Although stopped after two months, the operation can be continued still further.

When air is not introduced, on the contrary, clogging occurred inside the column and the passage of the treating liquid was interrupted after 6 to 8 hours.
(B) Treating agent: Same as (A)
Column diameter: 300 mm φ
Packing height: 1500 mm
Liquid flow rate: 40 l/hr, down flow
SS in the treating liquid: 750 to 1000 ppm
Size of liquid outlet holes: 3 mm φ
Hole inclination angle with respect to the funnel-shaped wall: 45 degrees Under these conditions, fully continuous operation was conducted without any troubles over a period of two months. Although stopped after two months, the operation can be continued still further.

When the liquid outlet holes was disposed normal to the funnel-shaped wall, clogging occurred around the outlet holes on the wall and the passage of the treating liquid was interrupted after 12 to 15 hours.

As apparent from the foregoing, the treating agent of the present invention is able to adsorb dyes and/or other organic substances by one passage of the treating liquid containing the same, requiring a minimum of equipment size and installation space. The operation time is greatly shortened; only 20 minutes, in an example, relative to 500 minutes or longer required in conventional processes. Furthermore, the process of the present invention features ease of operation; it requires no special skill and even unmanned operation will be possible. A variety of dyes and other organic substances, such as sizing agents and surfactants can be removed simultaneously by one step. These are outstanding features of the process of the present invention not expected in conventional ones.

The process and equipment of the present invention, in which an inactive gas is introduced into the ascending or descending liquid and the gas inlet holes as well as the liquid inlet or outlet holes are disposed downwardly and inwardly at an inclination with respect to the wall of the funnel-shaped section of the column, enable continuous operation 200 times or more longer than when the inactive gas in not introduced. This also is an outstanding characteristic which is expected only in the present invention.

What is claimed is:

1. A treating agent for waste water containing dyes and/or other organic substances, which is a solid solution prepared by mixing as solids component A comprising a water-insoluble calcium salt and component B consisting mainly of aluminum hydroxide, aluminum oxide or a mixture thereof at a molar ratio of about 3:1 to 1:3 and heat-treating said mixture of components A and B at a temperature between 100° C. and 450° C.

2. The treating agent as set forth in claim 1, wherein said calcium salt is calcium sulfate, calcium phosphate, calcium carbonate, calcium oxalate, calcium fluoride or a mixture thereof.

3. The treating agent as set forth in claim 1, wherein said aluminum compound in component B is the aluminum sludge discharged from the alumium anodizing process.

4. The treating agent as set forth in claim 1, wherein said mixture of components A and B is granulated prior to the heat-treatment.

5. A process for treating waste water containing dyes and/or other organic substances, comprising bringing said waste water into contact with a treating agent prepared by mixing component A comprising a water-insoluble calcium salts and component B consisting mainly of aluminum hydroxide, aluminum oxide or a mixture thereof at a molar ratio of 3:1 to 1:3 and heat-treating said mixture of components A and B at a temperature between 100° C. and 450° C.

6. The process for treating waste water as set forth in claim 5, wherein the waste water containing dyes and/or other organic substances is allowed to flow downward through a column packed with said granulated treating agent while blowing an inactive gas through the bottom of the column.

7. The process for treating waste water as set forth in claim 6, wherein said inactive gas is air.

8. The process for treating waste water as set forth in claim 5, wherein said calcium salt is calcium sulfate, calcium phosphate, calcium carbonate, calcium oxylate, calcium fluoride or a mixture thereof.

* * * * *